US005455503A

United States Patent [19]
Kohler

[11] Patent Number: 5,455,503
[45] Date of Patent: Oct. 3, 1995

[54] LOW POWER SWITCHING SUPPLY CIRCUITS AND METHODS

[75] Inventor: Raymond H. Kohler, Souderton, Pa.

[73] Assignee: Moore Products Co., Spring House, Pa.

[21] Appl. No.: 255,575

[22] Filed: Jun. 8, 1994

Related U.S. Application Data

[63] Continuation of Ser. No. 147,897, Nov. 5, 1993, abandoned, which is a continuation of Ser. No. 18,462, Feb. 16, 1993, abandoned, which is a continuation of Ser. No. 746,765, Aug. 16, 1991, abandoned.

[51] Int. Cl.⁶ .................................................. G05F 1/565
[52] U.S. Cl. ........................... 323/273; 323/280; 363/21; 363/97
[58] Field of Search .................................. 363/20, 21, 41, 363/95, 97, 124, 31; 323/266, 273–277, 280; G05F 1/56, 1/565

[56] References Cited

U.S. PATENT DOCUMENTS

| | | |
|---|---|---|
| 2,386,458 | 10/1945 | Haug . |
| 2,886,768 | 5/1959 | Minder . |
| 2,963,637 | 12/1960 | Osborn ..................................... 323/276 |
| 2,969,498 | 1/1961 | Stenudd . |
| 3,089,083 | 5/1963 | Baeck . |
| 3,090,017 | 4/1963 | Novic . |
| 3,124,697 | 3/1964 | Trenchard . |
| 3,400,326 | 9/1968 | Zhukov et al. . |
| 3,428,882 | 2/1969 | Gilbert . |
| 3,530,370 | 9/1970 | Yamachi et al. . |
| 3,680,384 | 8/1972 | Grindheim . |
| 3,686,560 | 8/1972 | Lutterkort . |
| 4,037,271 | 7/1977 | Keller ........................................ 363/21 |
| 4,121,150 | 10/1978 | Kelley, Jr. . |
| 4,242,665 | 12/1980 | Mate . |
| 4,289,951 | 9/1981 | Jurek . |
| 4,305,032 | 12/1981 | Grace . |
| 4,459,651 | 7/1984 | Fenter ....................................... 363/21 |
| 4,486,821 | 12/1984 | Itakura ...................................... 363/18 |
| 4,549,254 | 10/1985 | Kissel . |
| 4,689,730 | 8/1987 | Kimura ..................................... 363/21 |
| 4,727,466 | 2/1988 | Sakai . |
| 4,761,702 | 8/1988 | Pinard ....................................... 363/21 |
| 4,864,482 | 9/1989 | Quazi et al. .............................. 363/37 |
| 4,888,821 | 12/1989 | Hamp, III et al. ....................... 363/21 |
| 4,954,960 | 9/1990 | Lo et al. . |
| 4,961,044 | 10/1990 | Kravitz . |
| 4,964,028 | 10/1990 | Spataro .................................... 363/21 |
| 5,001,649 | 3/1991 | Lo et al. . |

FOREIGN PATENT DOCUMENTS

WO91/15054  10/1991  WIPO .

OTHER PUBLICATIONS

Electronics & Wireless World, vol. 95, No. 1641, Jul. 1989, Surrey GB, pp. 651–654, Nattra et al., '10W Flyback Converter' * the whole document*.

Primary Examiner—Steven L. Stephan
Assistant Examiner—Adolf Berhane
Attorney, Agent, or Firm—Synnestvedt & Lechner

[57] ABSTRACT

Switching power supplies for low power circuits. Power supplies described and disclosed herein comprise a linear regulator for regulating an input power to this power supply, a flyback regulator with three modes of output control comprising indirect sense feedforward, feedback, and override control. Indirect sense feedforward responds to changes in input voltage. The feedback responds to changes in output voltage with use of both of these wide variations in input voltage and output load can be tolerated. The override control takes over during abnormal conditions such as startup and short circuit. Switching power supplies described herein have high efficiencies and provide efficient power management, especially in low power budget applications.

2 Claims, 3 Drawing Sheets

LOW POWER SWITCHING SUPPLY CIRCUITS AND METHODS

This is a continuation of application Ser. No. 08/147,897, filed Nov. 5, 1993, now abandoned which is a continuation of Ser. No. 08/018,462, filed Feb. 16, 1993, now abandoned, which is a continuation of Ser. No. 07/746,765, filed Aug. 16, 1991, now abandoned.

FIELD OF THE INVENTION

This invention relates generally to power supplies for electronic circuitry. More specifically, this invention relates to power supply circuits having regulated voltage outputs.

BACKGROUND OF THE INVENTION

Process control is a long-established art which plays a major role in managing industrial plants and processes. In this art, process transmitters have been used to monitor process variables. Having evolved from the earliest measurement devices such as barometers and thermometers, the process transmitter has traditionally received a great deal of technological attention to improve performance due to the need for accurate process measurement. Since the accuracy of every measurement made in a process control loop is directly dependent upon the accuracy of the particular process transmitter or instrument which closes the loop, the process transmitter plays a particularly sensitive role in industrial process control systems.

Beginning in the 1950s, electrical and electronic process control loops were a natural development from prior electromechanical control systems. The general problem of electronic process control is to convert a physical variable to an electrical signal, and to subsequently transmit that signal to a recorder and/or other control equipment which may be located some distance away from the physical variable. Early types of process control loops to accomplish this goal were "four-wire" systems, and were configured such that operating power was supplied through two of the four wires and a process signal was transmitted through the other two wires. The four-wire system requires the use of amplifiers or other signal conditioning equipment at the point of measurement in order to supply an accurate signal representative of the physical variable since the process signal is generally very low. See, e.g., U.S. Pat. No. 3,680,384, of Grindheim. Prior four-wire transmitter systems thus required separate power supply lines, and voltage power supplies.

After the four-wire transmitter was developed, it became apparent that the advantages of using the same two wires for power supply and information transmission would greatly improve the process control art. The "two-wire" transmitter was then developed and operates today in a control loop in conjunction with an external power supply, a pair of wires from the supply, and a transmitter connected serially between the wires. As used herein, the term "two-wire" is construed broadly to mean two conductors. Thus, the term "two-wire" includes actual wires, twisted pairs, coaxial cables, and other pairs of conductors.

During operation of such a two-wire transmitter loop, the transmitter energizes a sensor element and receives informational signals from the sensor element. The information is transmitted on the pair of wires by varying the current in the current loop. Thus the transmitter acts as a variable current sink, and the amount of current which it sinks is representative of the information from the sensor. Such prior two-wire transmitter loops have generally been analog in nature, and the industry standard which has developed for two-wire transmitters is a 4 to 20 milliamp loop, with a variable loop supply voltage having a maximum output of 42 volts DC. With such a low voltage supply, two-wire transmitter loops are particularly suited for use in hazardous environments. See, e.g., U.S. Pat. No. 4,242,665, of Mate.

More advanced prior two-wire transmitter control loops exhibit high-level data communication between two-wire transmitters and various receiving elements, for example controllers and communication devices. The concept of digital communication in 4 to 20 milliamp control systems is known for use in the more complicated 4 to 20 milliamp loops having both digital and analog components. Transmitters suitable for such purposes are usually called "smart" transmitters because they are more accurate and have operating parameters which may be remotely controlled.

The trend in two-wire transmitter loops both in the smart, microprocessor-based transmitter area and the traditional analog transmitter area, has been to reduce the power requirements for components which are used in the loop. This need has arisen since the amount of power which a two-wire transmitter may draw from a current loop to use for its operation is severely limited. With a nominal 10-volt supply, at the bottom end of operation only about 40 milliwatts is available to power any instrumentation in the loop. Thus with large power demands on the loop, two-wire control systems may be limited to a few low power industrial control applications. This aspect of industrial controls competes with the general desire to design instrumentation into the loop to simplify loop operation and installation, and to provide intrinsic safety in a low power process control environment.

This long-felt need has not adequately been met by process control loops which have the aforementioned inherent power budget problems. Since only 40 milliwatts of power are available to run the circuitry in the transmitter and the loop, power supply circuits have been developed which attempt to minimize power loss in the circuit and provide steady power levels to the control loop. Traditional methods of supplying low power to electronic circuitry include the well known "flyback regulator control" power supply circuits wherein the pulse width of the output current is based on a flyback voltage developed across an inductor in the circuit. In this type of power supply circuit, a pass transistor is usually turned on and the inductor current is allowed to rise until a threshold is reached turning off the pass transistor.

In flyback regulator control circuits, generally two methods have been used to sense the inductor current. The flyback inductor saturation current may be sensed, or a shunt resistor can be placed in series with the flyback inductor to directly sense the state of the flyback inductor current. However, both of these current sensing techniques introduce a large amount of power loss to the power supply, and therefore are unacceptable for use in low power 40 milliwatt systems. Prior power supplies using these methods of sensing the inductor current simply do not fulfill a long-felt need in the art for low power loss switching power supplies for electronic circuitry.

Two-wire transmitters are often remotely located. The length of the wires connecting components in the loop can exceed 5000 feet, and the longer wires have higher resistance. This resistance reduces the voltage to the transmitter. Other devices such as indicators, recorders and barriers are usually added to the loop, further increasing the loop resistance. Large amounts of loop resistance cause a wide variation in the input voltage. Changes of load current can vary widely also as different digital systems are accessed. The combination of high line variation and high load variation place a difficult burden on the traditional methods of switching power supply control circuits which have the further requirement of low startup current.

It is thus important in designing low power electronic systems, and particularly two-wire transmitters for use in process control loops, to provide switching power supplies having low loss regulated voltage control. These power supplies should provide a steady output to run the electronic circuitry in the system, and should provide reliable output voltages which are dependable for use in sensitive electronic instrumentation. Furthermore, these power supplies should have high efficiencies so that the power output is continuously available to the system. These goals have not previously been achieved in the switching power supply art.

SUMMARY OF THE INVENTION

Switching power supplies provided in accordance with the present invention solve the aforementioned long-felt needs and achieve the goals stated above. In a preferred embodiment, a switching power supply circuit comprises linear regulator means input with an unregulated voltage for regulating input power to the power supply and producing a linearly regulated voltage. Flyback regulator means interfaced with the linear regulator means for controlling an output voltage according to the unregulated input voltage is provided. Monitoring means interfaced between the linear regulator means and the flyback regulator means for monitoring the output voltage output from the flyback regulator means and emulating the input unregulated voltage to cause the flyback regulator means to produce a power pulse having a pulse width is further preferably provided.

Further in accordance with the present invention, a method of providing a regulated output supply voltage is provided. The method preferably comprises the steps of regulating initially an input voltage to an input voltage level, energizing an output voltage in response to the input voltage level, sensing indirectly a current related to the output voltage level to provide pulse width modulation, and feeding back a signal indicative of the output voltage to control a repetition rate of the output pulses.

Feedback and override control that resets an indirect current sensing means and provides current limiting for startup and short circuit protection are also advantageously provided in accordance with the invention. Power supply circuits and methods provided in accordance with the present invention provide highly efficient power supplies with very little power loss due to regulation or control of the circuits. To achieve these goals and objects, three modes of control are preferably used. These are an indirect sense feedforward, feedback, and an override control. Furthermore, these circuits provide highly efficient regulated power sources for low power electronic instrumentation, and greatly increase the efficiency of two-wire transmitters and process control loops which utilize these circuits.

Switching power supply circuits described herein have performance efficiencies of about 90%. Such results have not heretofore been achieved in the art and solve a long-felt need in the art for low power loss, high efficiency switching power supplies for use in low power electronic circuits and systems.

DETAILED DESCRIPTION OF PREFERRED EMBODIMENTS

Figure 1:
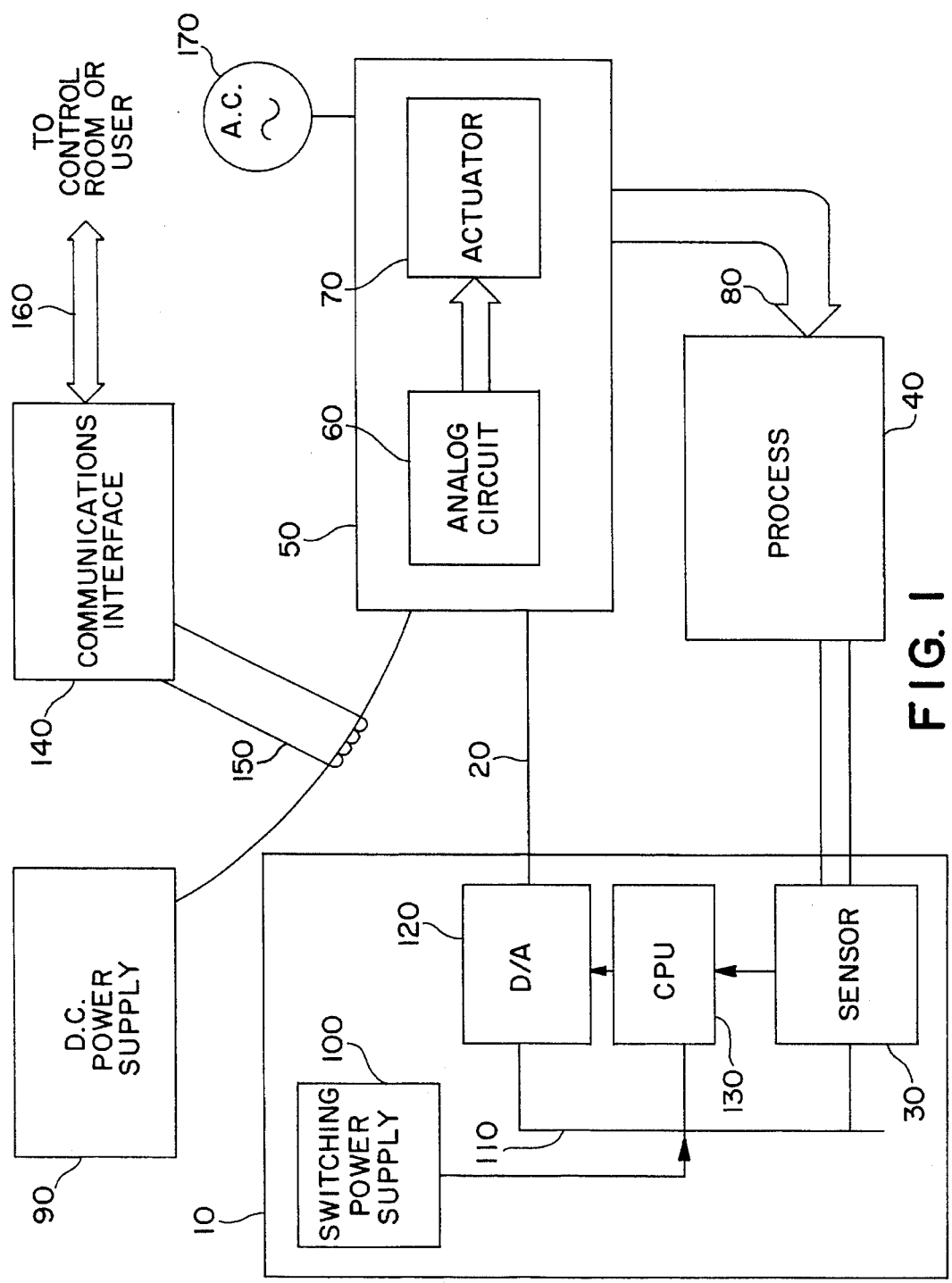
FIG. 1 is a block diagram of a two-wire control system having a two-wire transmitter utilizing a switching power supply in accordance with the present invention.

Referring now to the drawings wherein like reference numerals refer to like elements, FIG. 1 is a schematic block diagram of a two-wire transmitter process control loop utilizing a switching power supply provided in accordance with the present invention. A two-wire transmitter 10 provides an output 4 to 20 milliamp analog signal 20 to the control loop. Transmitter 10 is preferably a two-wire transmitter which has a sensing element 30 interfaced with a process 40 which the loop monitors and controls. The process 40 may be any type of industrial process such as fluid flow, level, pressure, temperature, or any other type of process having a process variable which it is desired to monitor. The two-wire transmitter 10 may also provide control functions to the loop and the 4 to 20 milliamp analog signal 20 may also therefore be a 4 to 20 milliamp control signal adapted to interface with a final control element 50.

The final control element 50 in preferred embodiments comprises an analog circuit 60 directly interfaced with the 4 to 20 milliamp analog signal 20. An analog circuit 60 is interfaced with an actuator 70 which is further interfaced at 80 with the process 40. Analog circuit 60 receives and interprets to 4 to 20 milliamp analog control signal 20 and busses this signal to the actuator 70. The actuator 70 may actuate a valve to control the process variable when the process is a fluid flow process, for example. However, it will be recognized by those with skill in the art that since other types of processes as mentioned above can be monitored and controlled with the control loop shown in FIG. 1, the actuator can be modified to fit the particular process variable which is under control in the system. The actuator and control element 50 interfaced at 80 with the process 40 provides control of the process variable in accordance with a particular control protocol that is designed for the industrial application in which the control system is placed.

The control system is preferably powered by a DC power supply 90 having a fixed output of up to 42 volts DC. The entire DC power to run the loop is provided by DC power supply 90, and so the entire 4 to 20 milliamp analog range appears on the control loop by virtue of the DC power supply 90.

DC power supply 90 is directly interfaced to the transmitter 10 to provide unregulated power to the transmitter. Preferably, a switching power supply 100 in accordance with the present invention regulates the power received by DC power supply 90 and outputs the regulated power onto a power bus 110 to supply the various circuit components in the transmitter 10. The circuit components in the transmitter 10 such as a digital-to-analog (D/A) converter 120, a system CPU 130, and the sensor 30, as well as other necessary circuitry in the transmitter 10 and components in the loop, have regulated power supplied to them by the switching power supply 100. The switching power supply 100 is preferably a 40 milliwatt power supply having an efficiency of between about 30% and 90%.

In a further preferred embodiment, a digital communications interface 140 is interfaced with the control loop at 150 and provides the ability for the control loop to have a digital, bidirectional communications protocol superimposed on the 4 to 20 milliamp analog signal. Communications interface 140 also busses information at 160 to a control room or user in digital form. This digital information is usually related to loop parameter values and the process variable especially when the transmitter 10 operates in a controller mode to control the process 40.

An AC power supply 170 is optionally provided to supply additional power to the final control element 50 especially when the actuator 70 is interfaced with an electromechanical valve requiring a strong electromagnetic force to actuate the valve. AC power 170 in preferred embodiments provides enough power to actuate a heavy duty control valve in pressure and flow applications.

Figure 2:
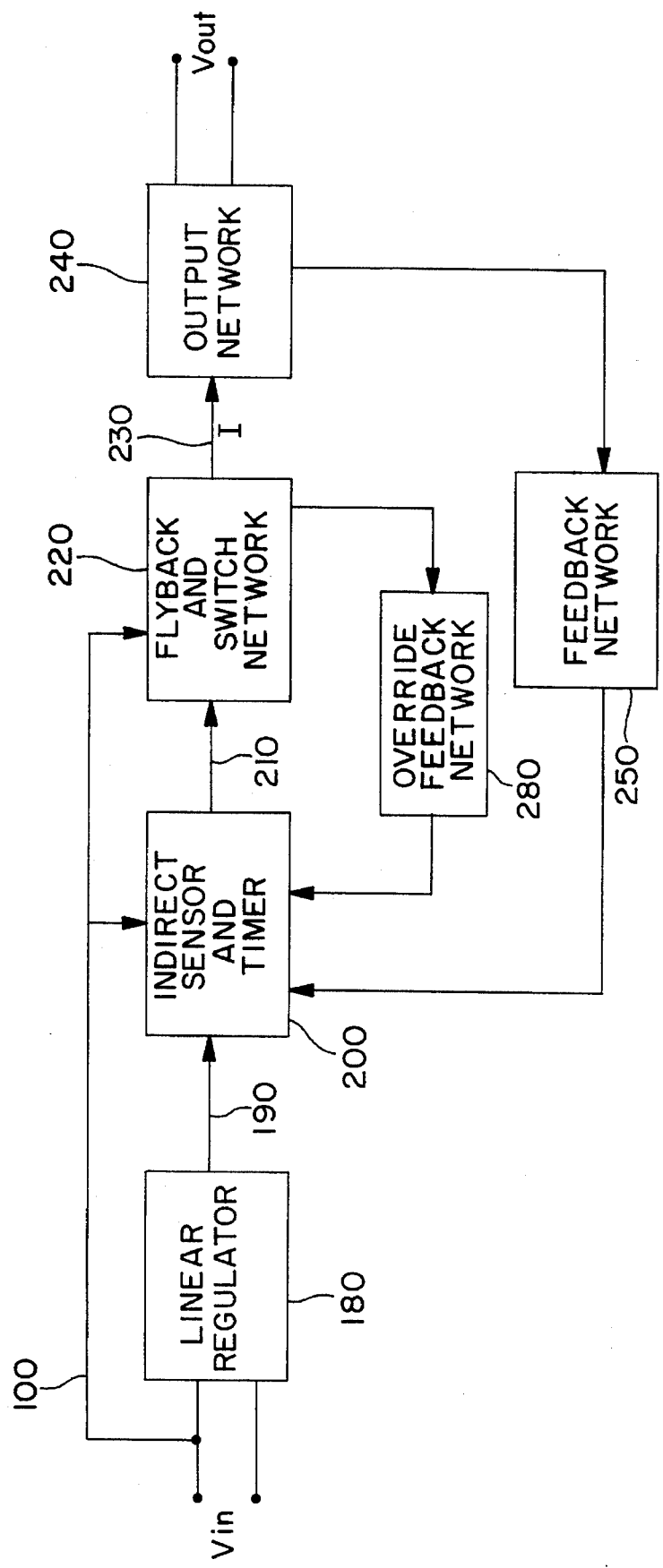
FIG. 2 is a functional block diagram of a switching power supply provided in accordance with the present invention.

Referring to FIG. 2, a functional block diagram of switching power supply 100 for producing an output voltage ($V_{out}$) in response to an unregulated input voltage ($V_{in}$), is shown. Linear regulator means 180 provides initial regulation of $V_{in}$ (a 10 to 42 volt DC level) and initially conditions $V_{in}$ to a linearly regulated voltage 190 which is further input to the switching power supply. The linear regulator means 180 produces a linearly regulated voltage $V^+$ which is used by the rest of the circuit to produce $V_{out}$. The unregulated input voltage $V_{in}$ is input to a monitoring means 200 which is preferably adapted to monitor the output voltage $V_{out}$ and to control $V_{out}$ with internal timing, direct, and indirect sensing elements which comprise the monitoring means 200.

The output 210 from the monitoring means 200 in a preferred embodiment is input to standard flyback regulator and switch means 220 which is adapted to provide an output current 230 to an output network 240. An override feedback block 280 preferably directly senses abnormal currents in the flyback means 220 and resets monitoring means 200. The output network 240 conditions the current and converts it to the output voltage $V_{out}$ which is then usable by the electronic circuitry in the two-wire transmitter and powers the instrumentation in the control loop.

In a further preferred embodiment, a feedback network 250 is provided interfaced with the output network 240 for feeding back part the output voltage $V_{out}$ to the monitoring block 200 having the indirect sensing and timing elements therein. In this fashion, feedback network 250 controls the pulse repetition rate of the output.

Figure 3:
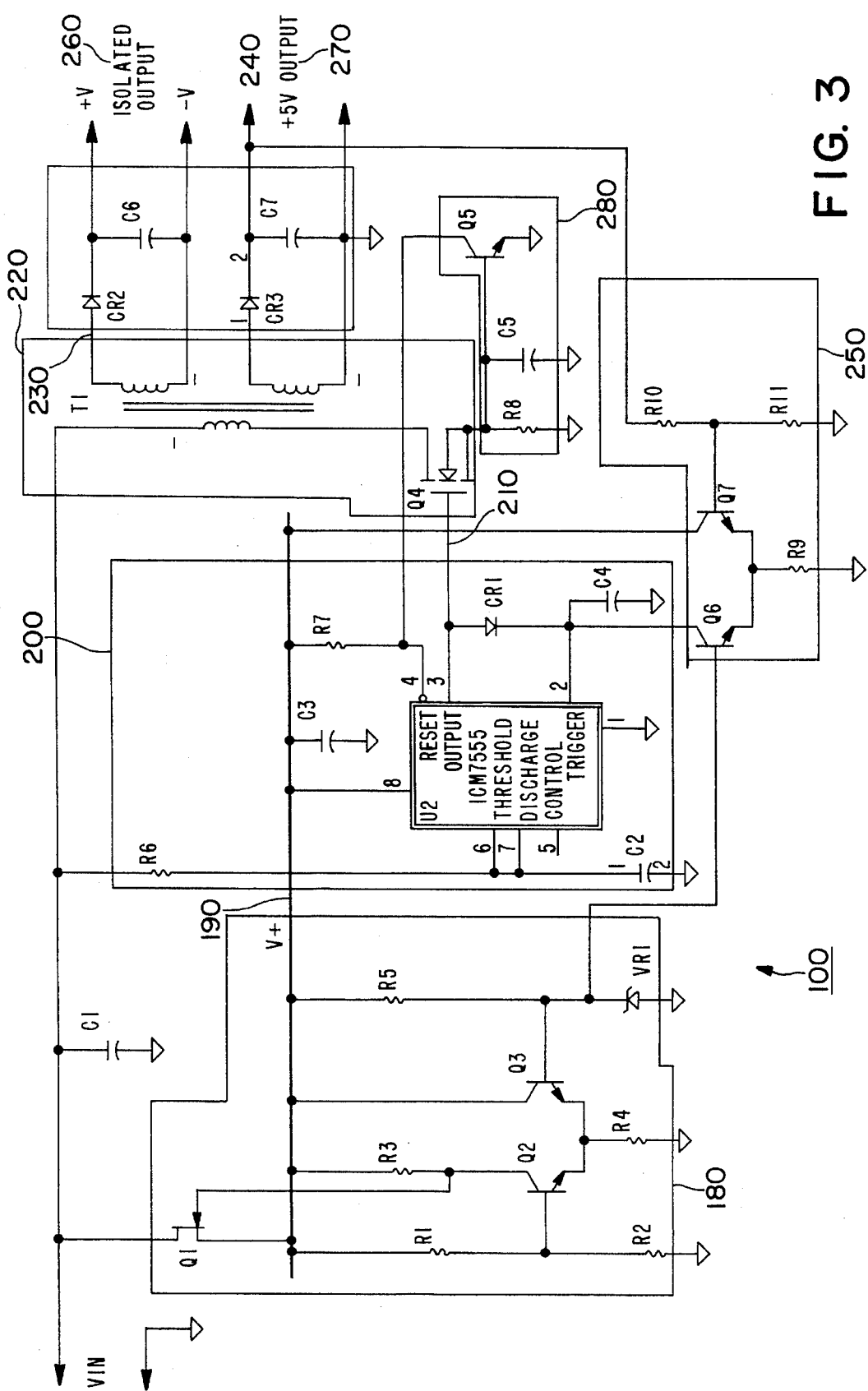
FIG. 3 is a detailed circuit schematic of a preferred embodiment of a low power loss, regulated switching power supply provided in accordance with the present invention.

FIG. 3 is a detailed circuit diagram of a preferred embodiment of a switching power supply provided in accordance with the present invention. In this circuit, Q1, Q2, Q3, R1 through R5 and the zener diode VR1 comprise the linear regulator 180. The linear regulator 180 allows a wide range of input voltages to be used, anywhere from 10 to 42 volts DC. Q2 and Q3 make up a difference amplifier circuit wherein the difference in reference voltage and the feedback output is amplified and drives the field effect transistor (FET) Q1 providing series regulation of $V^+$.

The monitoring means 200 having an indirect sensing means and timing element comprises the components R6, R7, C2, C4, U2 (which in preferred embodiments is an ICM7555 timing chip hereinafter referred to as a "555 timer") and CR1. The output from the timing chip is input at 210 to the flyback regulator 220 which further comprises Q4, an insulated gate FET or MOSFET, and an inductor coil T1 operating in the flyback mode.

The current 230 output from the flyback regulator circuit 220 is input to the output network 230 which comprises in a preferred embodiment capacitors C6 and C7 and diodes CR2 and CR3. In a further preferred embodiment, an isolated output 260 and a 5-volt output 270 are output from the output circuit 240. In still further preferred embodiments, a feedback signal from the 5-volt output 270 is input to feedback network 250 which is further interfaced to the monitoring circuit 200 to provide control of the pulse repetition rate of the output circuit from flyback regulator circuit 220.

As stated above, the linear regulator circuit 180 supplies a voltage $V^+$ to the 555 timer at pin eight in the monitoring circuit 200. The 555 timer switches Q4 in the flyback regulator block 220 such that T1 is operated in the flyback mode charging C6 and C7 in the output network 240. During normal operation, the current in the coil T1 is not directly sensed but instead, in a preferred embodiment, Q4 is switched off when the voltage on C2 is two thirds $V^+$ in a preferred embodiment. This eliminates the need for sensing the inductor saturation current which would otherwise dissipate an unacceptable amount of power in the circuit.

In accordance with the present invention, the values of R6 and C2 in the monitoring circuit 200 are chosen such that the voltage on C2 reaches two thirds $V^+$ at the same time the current in T1 reaches the desired threshold current. Thus the series network comprising R6 and C2 provides an indirect sensing element for the monitoring circuit 200 to, in effect, "sense" the current through T1 in the flyback regulator circuit 220. Since the voltage on C2 reaches two thirds $V^+$ at the same time the current in T1 reaches the desired threshold, and both of these events are proportional to $V_{in}$, they occur simultaneously regardless of the value of $V_{in}$.

When Q4 in the flyback regulator block 220 is switched off, capacitor C2 is preferably discharged to 0 volts, and inductor T1 to 0 current. The output voltage 270 is then sensed through R10 and R11 in feedback network 250 and fed back to a difference amplifier comprising Q6 and Q7 in the feedback circuit 250 whose output triggers the 555 timer.

In still further preferred embodiments, the current through Q6 in feedback circuit 250 and the current through the capacitor C4 in monitoring block 200 set a repetition rate of the pulses to control the output voltage 270. When Q4 in flyback regulator circuit 220 is conducting, the 555 timer output, shown at pin three, charges capacitor C4 through diode CR1. When the output voltage 270 goes low, diode CR1 is reversed biased. At this point, transistor Q6 in feedback network 250 discharges capacitor C4 in monitoring circuit 200 and triggers a new output pulse when the voltage value on capacitor C4 reaches one third $V_{in}$. During start-up and output short circuits, transistor Q5 and resistor R8 preferably act as an override control and limit the current in transistor Q4 to a safe level. Furthermore, the value of the sensing resistor R8 in override feedback block 280 is preferably small so that during normal operation it does not decrease the efficiency of circuit 100.

Thus, the circuit shown in FIG. 100 provides the advantage of indirectly sensing the current through the inductor T1 with a separate RC network comprising resistor R6 and C2 such that the RC time constant in parallel with T1 emulates the inductor T1's time constant. The current across T1 preferably ramps up in the same time as the voltage across C2 so that the RC time constant maintains the inductor T1's time constant to the same value. This provides a low power indirect sensing element and eliminates the need for a high value shunt resistor in series with the inductor, or direct sensing of the inductor saturation current for regulated control.

The general purpose 555 timer U2 provides feedback control through the switching power supply 100. In a preferred embodiment, there are three feedback paths in the circuit which provide different functions. A "threshold"

feedback pin 6, is provided for varying the pulse width with input voltage change to produce the output voltage 270. The "trigger" feedback path, pin two, of the 555 timer U2 controls the pulse frequency and senses the output voltage change through the feedback network 250. A "reset" feedback, pin 4, provides soft start-up with resistor R8 coupled to the primary of transformer T1 to provide an over-current sensor, and to protect transistor Q4 during start-up.

The circuit 100 of FIG. 3 provides a regulated 40 milliwatt power budget to electronic instrumentation in a two-wire control loop. This circuit has an approximately 90% power regulation efficiency which has not heretofore been achieved in the art, thereby allowing efficient and constant 40 milliwatt power to be provided continuously to the loop. Such results have not heretofore been achieved in the art and provide great advantages over prior circuits and networks of a power regulation.

There have thus been described certain preferred embodiments of switching power supply circuits and methods provided in accordance with the present invention. While preferred embodiments have been described and disclosed, it will be recognized by those with skill in the art that modifications are within the true spirit and scope of the invention. The appended claims are intended to cover all such modifications.

What is claimed is:

1. In a flyback voltage generator comprising a flyback transformer having a primary inductor and a secondary inductor coupled to each other; a source of d-c input voltage and pulse means connected to said source of d-c input voltage for passing current pulses through said primary inductor; circuit means connected to said secondary inductor for developing a regulated direct output voltage in response to flyback pulse generated in said secondary inductor by the terminations of said primary inductor current pulses; and timer means for controlling the times of initiation and termination of said primary inductor pulses in response to control signals supplied thereto, to regulate said direct output voltage; the improvement wherein said timer means comprises a first R-C circuit supplied with said input voltage for controlling the durations of said primary inductor current pulses as a function of said input voltage, a second R-C circuit responsive to said output voltage for providing continuous control of the repetition frequency of said primary inductor current pulses as a function of said output voltage, and an override circuit, connected to said primary inductor for terminating any of said primary inductor current pulses the intensity of which reaches a predetermined level;

said first R-C circuit having a charging time constant analogous to that of said primary inductor, said timer means being responsive to the voltage across the capacitance of said first R-C circuit to decrease the durations of said primary inductor pulses when said capacitor voltage increases and to increase their durations when said capacitor voltage decreases; said second R-C circuit being responsive to variations in said direct output voltage to increase said pulse repetition frequency continuously when said direct output voltage tends to decrease and to decrease said pulse repetition frequency continuously when said direct output voltage tends to increase; and said override circuit comprising means for sensing the intensities of said pulses of current through said primary inductor to produce a control signal, and means for applying said control signal to terminate any of said pulses when its intensity reaches said predetermined level.

2. The flyback voltage generator of claim 1, wherein said override circuit comprises resistive means in series with said primary inductor for developing an override control voltage proportional to said primary inductor current intensities, and means for applying said override control voltage to terminate any primary current pulse whose intensity rises to said predetermined level.

* * * * *